US008236727B2

(12) United States Patent
Ohta et al.

(10) Patent No.: US 8,236,727 B2
(45) Date of Patent: Aug. 7, 2012

(54) OXYGEN-ABSORBING RESIN COMPOSITION AND OXYGEN-ABSORBING CONTAINER COMPRISING THE SAME

(75) Inventors: Yoshihiro Ohta, Yokohama (JP); Yui Yamaguchi, Yokohama (JP); Yoichi Ishizaki, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 0 days.

(21) Appl. No.: 12/812,931

(22) PCT Filed: Jan. 19, 2009

(86) PCT No.: PCT/JP2009/050624
§ 371 (c)(1),
(2), (4) Date: Aug. 31, 2010

(87) PCT Pub. No.: WO2009/091058
PCT Pub. Date: Jul. 23, 2009

(65) Prior Publication Data
US 2010/0317514 A1    Dec. 16, 2010

(30) Foreign Application Priority Data

Jan. 18, 2008 (JP) .................................. 2008-9186

(51) Int. Cl.
*B01J 20/26* (2006.01)
(52) U.S. Cl. ........ 502/402; 525/165; 525/166; 525/168; 525/174; 525/176; 525/445
(58) Field of Classification Search .................. 502/402; 525/165, 166, 168, 174, 176, 445
See application file for complete search history.

(56) References Cited

U.S. PATENT DOCUMENTS

| | | | |
|---|---|---|---|
| 3,857,754 A | 12/1974 | Hirata et al. |
| 3,975,463 A | 8/1976 | Hirata et al. |
| 7,078,100 B2 | 7/2006 | Ebner et al. |
| 7,452,601 B2 | 11/2008 | Ebner et al. |
| 7,608,340 B2 | 10/2009 | Tsuji et al. |
| 7,608,341 B2 | 10/2009 | Tsuji et al. |
| 2005/0048287 A1 | 3/2005 | Ebner et al. |
| 2005/0153087 A1* | 7/2005 | Tsuji et al. .................. 428/35.7 |
| 2006/0281882 A1 | 12/2006 | Tsuji et al. |
| 2007/0036923 A1 | 2/2007 | Ishizaki et al. |
| 2008/0227912 A1 | 9/2008 | Ohta et al. |
| 2009/0098323 A1 | 4/2009 | Ohta et al. |

FOREIGN PATENT DOCUMENTS

| | | |
|---|---|---|
| CN | 1636630 A | 7/2005 |
| EP | 1 953 180 A1 | 8/2008 |
| JP | 48010149 A | 2/1973 |
| JP | 05105784 A | 4/1993 |
| JP | 2003342426 A | 12/2003 |
| JP | 2007-070522 * | 3/2007 |
| JP | 2007070522 A | 3/2007 |
| JP | 2007302874 A | 11/2007 |
| WO | WO-2005023911 A1 | 3/2005 |
| WO | WO-2005030854 A1 | 4/2005 |
| WO | WO-2005105887 A1 | 11/2005 |
| WO | WO-2007058313 A1 | 5/2007 |
| WO | WO-2007119657 A1 | 10/2007 |

OTHER PUBLICATIONS

International Search Report and Written Opinion for PCT/JP2009/050624 dated Apr. 7, 2009.
Extended European Search Report for Application No. 09703034.0, dated Oct. 27, 2011.
China State Intellectual Property Office action in counterpart Chinese patent application No. 200980109636.7, dated Apr. 5, 2012 (Chinese-language).

* cited by examiner

*Primary Examiner* — David W Wu
*Assistant Examiner* — Robert Jones, Jr.
(74) *Attorney, Agent, or Firm* — Marshall, Gerstein & Borun LLP

(57) ABSTRACT

An oxygen-absorbing resin composition having excellent performance is provided which contains an oxygen-absorbing polyester and a polyolefin and has enhanced compatibility between the polymers to give an oxygen-absorbing layer inhibited from having a reduced cohesive force or an appearance failure such as roughness unevenness. The oxygen-absorbing resin composition is characterized by being obtained by melt-kneading the following ingredients (A) and (B) together with the following ingredient (C) as a compatibilizing agent. Ingredient (A): an oxygen-absorbing polyester; Ingredient (B): a polyolefin; and Ingredient (C): a copolymer of ethylene and a vinyl monomer having a hydroxy group or an ester bond, the copolymer having an ethylene proportion of 70-99 mol %.

16 Claims, No Drawings

OXYGEN-ABSORBING RESIN COMPOSITION AND OXYGEN-ABSORBING CONTAINER COMPRISING THE SAME

TECHNICAL FIELD

The present invention relates to an oxygen-absorbing resin composition and an oxygen-absorbing container comprising the same.

BACKGROUND ART

Presently, various plastic containers are used for packaging because of their advantages such as light weight, transparency and easiness of molding.

However, because an oxygen barrier property of the plastic containers is lower than those of metal containers and glass containers, the plastic containers have problems in that the contents of the containers deteriorate due to chemical oxidation and the action of aerobic bacteria.

For preventing these problems, the plastic container walls have a multi-layer structure in which at least one layer is made of a resin having an excellent oxygen barrier property such as ethylene-vinyl alcohol copolymer. In addition, there are other kinds of containers having an oxygen-absorbing layer containing an oxygen-absorbing polyester for removing oxygen remaining in the containers and also oxygen penetrating into the container from the outside (see Patent Document 1).

Patent Document 1: International Patent Application Publication No. WO2005/023911
Patent Document 2: International Patent Application Publication No. WO2005/030854
Patent Document 3: International Patent Application Publication No. WO2005/105887
Patent Document 4: International Patent Application Publication No. WO2007/058313
Patent Document 5: Un-Examined Patent Publication (JP KOKAI) No. 2007-302874

SUMMARY OF INVENTION

Into the oxygen-absorbing layer containing the oxygen-absorbing polyester, a polyolefin serving as a diluent may be added for suppressing generation of a gel during a molding process and for suppressing deterioration in strength occurring after the absorption of oxygen. However, the compatibility between the oxygen-absorbing polyester and the polyolefin is poor. Hence, decrease in the cohesive force of the oxygen-absorbing layer and an appearance failure such as asperities on the surface of a film are likely to occur. An object of the present invention is to provide an oxygen-absorbing composition having an excellent ability while suppressing the occurrences of the decrease in the cohesive force of the oxygen-absorbing layer and the appearance failure such as asperities by enhancing the compatibility between the oxygen-absorbing polyester and the polyolefin.

The present invention provides an oxygen-absorbing resin composition obtainable by melt-kneading the following component (A) and the following component (B) together with the following component (C) serving as a compatibilizer:
  component (A): an oxygen-absorbing polyester,
  component (B): a polyolefin, and
  component (C): a copolymer of ethylene and a vinyl monomer having a hydroxyl group or an ester bond, the copolymer having a proportion of ethylene of 70 to 99 mol %.

The compatibility between the oxygen-absorbing polyester and the polyolefin can be enhanced by using as the compatibilizer the copolymer of ethylene and a vinyl monomer having a hydroxyl group or an ester bond, the copolymer having a proportion of ethylene of 70 to 99 mol %. Consequently, it has been possible to provide an oxygen-absorbing resin composition having an excellent ability while suppressing the occurrences of the decrease in the cohesive force of the oxygen-absorbing layer and the appearance failure such as asperities.

DESCRIPTION OF EMBODIMENTS

The component (A), i.e., the oxygen-absorbing polyester, used for the oxygen-absorbing resin composition of the present invention is not particularly limited as long as the oxygen-absorbing polyester is a polyester having an oxygen-absorbing property. Preferably, the oxygen-absorbing polyester is obtainable by polymerizing a raw material containing a monomer selected from the group consisting of the following monomers (i) and (ii):

monomer (i): a monomer having a carbon atom bonded to both of groups having the following structures (a) and (b), respectively, and further bonded to one or two hydrogen atoms, the carbon atom being contained in an alicyclic structure:
  (a) a carbon-carbon double bond group, and
  (b) a group selected from the group consisting of heteroatom-containing functional groups, bonding groups derived therefrom, carbon-carbon double bond groups, and aromatic rings; and monomer (ii): a monomer in which a carbon atom adjacent to a carbon-carbon double bond in an unsaturated alicyclic structure is bonded to an electron donating group and a hydrogen atom, another carbon atom adjacent to the carbon atom is bonded to a heteroatom-containing functional group or a bonding group derived therefrom, and the electron donating group and the heteroatom-containing functional group or the bonding group derived therefrom are in a cis position.

The alicyclic structure in the foregoing monomer (i) may be a heterocyclic structure containing a heteroatom in the ring. Alternatively, the alicyclic structure may be either monocyclic or polycyclic structure, and if the alicyclic structure is a polycyclic structure, the rings other than those containing the foregoing carbon atom bonded to the electron donating group may be aromatic rings. The alicyclic structure is preferably a 3- to 12-membered monocyclic or polycyclic structure, more preferably a 5- or 6-membered monocyclic structure, and further preferably a 6-membered monocyclic structure. The 3- and 4-membered cyclic structures have a high strain energy, and thus they are liable to easily cause the opening of rings to form a linear chain structure. Regarding a 7- or more membered cyclic structure, the synthesis thereof becomes more and more difficult as the size of the ring increases, and thus it would be unfavorable for industrial use. Particularly, the 6-membered cyclic structures are stable from the viewpoint of energy and can also be easily synthesized, and thus they are preferable. Moreover, the foregoing alicyclic structure contains a carbon atom bonded to both of the structures (a) and (b) and further bonded to one or two hydrogen atoms. Preferably, the foregoing alicyclic structure has the carbon-carbon double bond group of the structure (a) therein.

The hetero atom-containing functional group or the bonding group derived therefrom of the structure (b) of the monomer (i) includes for example a hydroxyl group, carboxyl group, formyl group, amido group, carbonyl group, amino group, ether bond, ester bond, amido bond, urethane bond and urea bond. A functional group comprising an oxygen atom as the hetero atom and a bonding group derived therefrom are preferable, and includes for example the hydroxyl group, carboxyl group, formyl group, amido group, carbonyl group, ether bond, ester bond, amido bond, urethane bond and urea bond. The carboxyl group, carbonyl group, amido group, ester bond and amido bond are more preferable. The monomer (i) having these functional groups and bonding groups can be prepared through relatively simple synthetic reactions, and thus they are advantageous for industrial use.

The aromatic ring of the structure (b) of the monomer (i) includes for example a benzene ring, naphthalene ring, anthracene ring, phenanthracene ring and diphenyl ring. The benzene ring and naphthalene ring are preferable, and the benzene ring is more preferable.

In addition, the carbon atom bonded to both of the structures (a) and (b) and included in the alicyclic structure is preferably bonded to one hydrogen atom. If one of the two hydrogen atoms bonded to a carbon atom is replaced by for example an alkyl group, and as a result the carbon atom is bonded to one hydrogen atom, the resulting resin would be further improved in its ability to absorb oxygen. In this connection, the derivative includes esters, acid anhydrides, acid halides, substitution products and oligomers.

The unsaturated alicyclic structure of the monomer (ii) may be a heterocyclic structure containing a heteroatom in the ring. Moreover, the unsaturated alicyclic structure may be either monocyclic or polycyclic structure, and if the unsaturated alicyclic structure is a polycyclic structure, the rings, other than those containing the forgoing carbon atom bonded to the electron donating group, may be aromatic rings. The unsaturated alicyclic structure is preferably a 3- to 12-membered monocyclic or polycyclic structure, more preferably a 5- or 6-membered monocyclic structure, and further more preferably a 6-membered monocyclic structure. Particularly, a 6-membered cyclic structure is stable from the view point of energy, and also can be easily synthesized. Accordingly, a 6-membered cyclic structure is preferable as the resin structure of the present invention.

Examples of the electron donating group of the monomer (ii) includes alkyl groups, such as a methyl group, an ethyl group, a propyl group, an isopropyl group, a butyl group, a sec-butyl group, and a tert-butyl group; a hydroxyl group; a methoxy group; an ethoxy group; an amino group; and derivatives thereof. Among these, a methyl group, an ethyl group, a methoxy group, and an ethoxy group are preferable, and a methyl group and an ethyl group are further more preferable.

The hetero atom-containing functional group or the bonding group derived therefrom of the monomer (ii) includes for example a hydroxyl group, carboxyl group, acid anhydride group, amido group, carbonyl group, amino group, ether bond, ester bond, amido bond, urethane bond and urea bond. A functional group comprising an oxygen atom as the hetero atom or bonding group derived therefrom is preferable, and includes for example the hydroxyl group, carboxyl group, acid anhydride group, formyl group, amido group, carbonyl group, ether bond, ester bond, amido bond, urethane bond and urea bond. The hydroxyl group, carboxyl group, acid anhydride group, carbonyl group, ether bond, ester bond and amido bond are more preferable. The monomer (ii) having these functional groups and bonding groups can be prepared through relatively simple synthetic reactions, and thus they are advantageous for industrial use.

The aforementioned monomers (i) and may be used alone or in any combination of at least two of them.

In the oxygen-absorbing polyester obtainable by polymerizing a raw material containing at least one of the monomers (i) and (ii), the amount of units of the monomer (i) and (ii) is preferably 5 to 50 mol %, more preferably 7.5 to 40 mol %, and further more preferably 10 to 30 mol %, of all monomer units contained in the resin. If the amount of units of the monomers (i) and (ii) is within the above ranges, a resin having an excellent ability to absorb oxygen can be obtained with gelation during polymerization and molding being suppressed.

The aforementioned oxygen-absorbing polyester obtainable by polymerizing the raw material containing at least one of the monomers (i) and (ii) may be blended with an oxygen absorption reaction catalyst (an oxidation catalyst) for accelerating the reaction. However, because of an extremely high reactivity toward oxygen, the oxygen-absorbing polyester can exhibit a practical ability to absorb oxygen in the absence of an oxygen absorption reaction catalyst. Also for the purpose of preventing excessive deterioration of the resin due to the oxygen absorption reaction catalyst during molding of the oxygen-absorbing resin composition of the present invention, it is desirable not to contain a catalytic amount of an oxygen absorption reaction catalyst. Here, examples of the oxygen absorption reaction catalyst include transition metal salts formed of transition metals such as manganese, iron, cobalt, nickel, and copper with organic acids. Here, the phrase "not to contain a catalytic amount of an oxygen absorption reaction catalyst" generally means that the oxygen absorption reaction catalyst contained is less than 10 ppm and preferably less than 1 ppm, in terms of the amount of transition metal.

The component (A), i.e., the oxygen-absorbing polyester used for the oxygen-absorbing resin composition of the present invention is preferably obtainable by polymerizing a raw material containing a monomer having the structure of tetrahydrophthalic acid or tetrahydrophthalic anhydride.

The monomer having the structure of tetrahydrophthalic acid or tetrahydrophthalic anhydride is preferably selected from the group consisting of Δ3-tetrahydrophthalic acid, derivatives thereof, Δ3-tetrahydrophthalic anhydride, and derivatives thereof, which correspond to monomer (i). More preferably, the monomer having the structure of tetrahydrophthalic acid or tetrahydrophthalic anhydride is selected from the group consisting of 4-methyl-Δ3-tetrahydrophthalic acid, derivatives thereof, 4-methyl-Δ3-tetrahydrophthalic anhydride, and derivatives thereof. In addition, also preferable are a monomer selected from the group consisting of cis-3-methyl-Δ4-tetrahydrophthalic acid, derivatives thereof, cis-3-methyl-Δ4-tetrahydrophthalic anhydride, and derivatives thereof, which correspond monomer (ii). The derivatives of tetrahydrophthalic anhydride can be quite easily synthesized by the Diels-Alder reaction of maleic anhydride with a diene such as butadiene, isoprene or piperylene. For example, products have been manufactured by subjecting a mixture of cis-3-methyl-Δ4-tetrahydrophthalic anhydride and 4-methyl-Δ4-tetrahydrophthalic anhydride, which are prepared by reacting C5-cut of the naphtha mainly comprising trans-piperylene and isoprene with maleic anhydride, to the stereoisomerization reaction or the structural isomerization reaction.

The component (A), i.e., the oxygen-absorbing polyester, used for the oxygen-absorbing resin composition of the present invention can be manufactured by the polymerization of the monomer having the structure of tetrahydrophthalic acid or tetrahydrophthalic anhydride with a diol component. Examples of the diol component include ethylene glycol, diethylene glycol, triethylene glycol, polyethylene glycol, propylene glycol, dipropylene glycol, polypropylene glycol, trimethylene glycol, 1,3-butanediol, 1,4-butanediol, 3-methyl-1,5-pentanediol, 1,6-hexanediol, 1,7-heptanediol, 1,8-octanediol, 1,9-nonanediol, neopentyl glycol, 1,4-cyclohexane dimethanol, 2-phenylpropanediol, 2-(4-hydroxyphenyl) ethyl alcohol, α,α-dihydroxy-1,3-diisopropylbenzene, o-xylene glycol, m-xylene glycol, p-xylene glycol, α,α-dihydroxy-1,4-diisopropylbenzene, hydroquinone, 4,4-dihydroxydiphenyl, naphthalenediol and derivatives thereof. Aliphatic diols such as diethylene glycol, triethylene glycol, 1,4-butanediol, 1,6-hexanediol are preferable, and 1,4-butanediol is more preferable. When 1,4-butanediol is used, the resulting resin has a high ability to absorb oxygen and a small amount of decomposition products generated in the course of oxidation. These diols may be used alone or in any combination of at least two of them. A small amount of a polyvalent alcohol having three or more hydroxy groups, such as glycerin, trimethylolpropane, or pentaerythritol, may be added.

Moreover, other dicarboxylic acid components can be used as a monomer in the polymerization of the component (A), i.e., the oxygen-absorbing polyester, used for the oxygen-absorbing resin composition of the present invention. Examples of the dicarboxylic acid includes aliphatic dicarboxylic acids such as succinic acid, oxalic acid, malonic acid, glutaric acid, adipic acid, pimelic acid, suberic acid, azelaic acid, sebacic acid, undecanedioic acid, dodecanedioic acid, and 3,3-dimethylpentanedioic acid; acid anhydrides thereof; alicyclic dicarboxylic acids such as cyclohexane dicarboxylic acid; and aromatic dicarboxylic acids such as phthalic anhydride, isophthalic acid, telephthalic acid, and 2,6-naphthalene dicarboxylic acid. Dicarboxylic acids having a carboxyl group directly bonded to an aromatic ring, and derivatives thereof are preferable, and examples thereof include phthalic anhydride, isophthalic acid, telephthalic acid, 2,6-naphthalene dicarboxylic acid, and derivatives thereof. Here, the derivative includes esters, acid anhydrides, acid halides, substituted products, oligomers, and the like. These may be used alone or in any combination of at least two of them. Particularly, a case where telephthalic acid is contained is preferable. A case where telephthalic acid and isophthalic acid are contained is further preferable. In addition, a small amount of a polycarboxylic acid having three or more carboxylic groups, such as trimellitic acid and 1,2,3,4-butane tetracarboxylic acid, or an acid anhydride thereof may be added. These acid components may be esterified to be, for example, methyl esters.

The component (A), i.e., the oxygen-absorbing polyester used for the oxygen-absorbing resin composition of the present invention is preferably a polyester obtainable by polymerizing a raw material containing the monomer having the structure of tetrahydrophthalic acid or tetrahydrophthalic anhydride, 1,4-butanediol, and telephthalic acid.

In addition, a hydroxy carboxylic acid such as glycolic acid, lactic acid, hydroxypivalic acid, hydroxycaproic acid, and hydroxyhexanoic acid; a hydroxy carboxylic ester thereof; a cyclic ester such as a glycolide and a lactide, or a lactone such as ε-caprolactone can be added as the monomer component in the polymerization of the component (A), i.e., the oxygen-absorbing polyester, used for the oxygen-absorbing resin composition of the present invention.

When the component (A), i.e., the oxygen-absorbing polyester, used for the oxygen-absorbing resin composition of the present invention is polymerized, a polymerization catalyst is not necessarily used, but it is possible to use a standard polyester polymerization catalyst such as titanium-containing, germanium-containing, antimony-containing, tin-containing and aluminum-containing polymerization catalysts. In addition, it is also possible to use any known polymerization catalysts such as nitrogen atom-containing basic compounds, boric acid, boric acid esters, and organic sulfonic acid type compounds.

The number average molecular weight of the component (A), i.e., the oxygen-absorbing polyester, used for the oxygen-absorbing resin composition of the present invention is preferably 1,000 to 1,000,000, and more preferably 2,000 to 200,000. When the number average molecular weight is within the above-described ranges, a film having excellent processability and durability can be formed. In addition, various additives such as an anti-coloring agent and an antioxidant, e.g., a phosphorus compound or the like, can also be added in the polymerization. The addition of an antioxidant can suppress deterioration of the ability of the oxygen-absorbing resin, because the antioxidant can suppress oxygen absorption during the polymerization and a subsequent molding process.

Moreover, as the component (A), i.e., the oxygen-absorbing polyester, used for the oxygen-absorbing resin composition of the present invention, a copolymer obtained through transesterification between the polyester and a saturated polyester resin can be used. With only the polymerization of the polyester, it is difficult to obtain a high molecular weight resin, and accordingly, a resin having a practically sufficient strength cannot be obtained in some cases. However, such copolymerization makes it possible to cause the resin to have a high molecular weight, and to securely provide the resin with strength acceptable in practical use. Examples of the saturated polyester resin include polyethylene terephthalate (PET), polybutylene terephthalate (PBT), polytrimethylene terephthalate (PTT), polyethylene naphthalate (PEN), glycol-modified polyethylene terephthalate (PETG), polyethylene succinate (PES), polybutylene succinate (PBS), polylactic acid, polyglycolic acid, polycaprolactone, and polyhydroxyalkanoate. The number average molecular weight of the oxygen-absorbing resin after the copolymerization is preferably 1,000 to 1,000,000, and more preferably 2,000 to 200,000.

The copolymerization through transesterification is preferable because it can be easily achieved by reactive extrusion, for example.

Alternatively, the polyester can be copolymerized by the reaction with a resin having a reactive functional group in its terminal or side chain, the resin being, for example, a polyether such as polyethylene glycol; a polyamide; or an acid-modified polyolefin.

Examples of the component (B), i.e., the polyolefin, used for the oxygen-absorbing resin composition of the present invention include polyethylenes such as low-density polyethylene, medium-density polyethylene, high-density polyethylene, linear low-density polyethylene, and linear very low-density polyethylene; polypropylene; poly-1-butene; poly-4-methyl-1-pentene; polyolefins such as random or block copolymers of α-olefins (such as ethylene, propylene, 1-butene and 4-methyl-1-pentene), cyclic olefin polymers (COP), and cyclic olefin copolymers (COC).

The component (B), i.e., the polyolefin, is preferably polyethylene, and particularly preferably low-density polyethylene.

These polyolefins may be used alone or in any combination of at least two of them.

In the oxygen-absorbing resin composition of the present invention, the weight ratio of the component (A) to the component (B) is preferably 4:1 to 3:7, and more preferably 7:3 to 2:3. If the proportion of the component (B) is high, gelation during the molding process is suppressed, and a good moldability is achieved. On the other hand, if the proportion of the component (A) is increased, the ability to absorb oxygen is improved, making it possible to reduce the thickness of the oxygen-absorbing layer.

Regarding the component (C), i.e., the copolymer of ethylene and the vinyl monomer having a hydroxyl group or an ester bond, used for the oxygen-absorbing resin composition of the present invention, the proportion of ethylene in the copolymer is preferably 70 to 99 mol %, further preferably 75 to 99 mol %, and most preferably 80 to 99 mol %. The copolymer having a proportion of ethylene within the above-described ranges is excellent as a compatibilizer between the component (A) and the component (B).

Examples of the copolymer of ethylene and a vinyl monomer having a hydroxyl group or an ester bond include copolymers of ethylene and a vinyl ester-based monomer, copolymers of ethylene and an alkynyl alcohol-based monomer, copolymer of ethylene and a (meth)acrylic ester-based monomer, and the like.

Examples of the copolymers of ethylene and a vinyl ester-based monomer include ethylene-vinyl formate copolymer, ethylene-vinyl acetate copolymer, ethylene-allyl acetate copolymer, ethylene-vinyl propionate copolymer, ethylene-vinyl lactate copolymer, ethylene-vinyl isolactate copolymer, ethylene-vinyl 2-ethylhexanoate copolymer, ethylene-vinyl benzoate copolymer, and the like.

Examples of the copolymers of ethylene and an alkynyl alcohol-based monomer include ethylene-vinyl alcohol copolymer, ethylene-allyl alcohol copolymer, ethylene-3-butane-1-ol copolymer, ethylene-4-pentene-1-ol copolymer, ethylene-5-hexane-1-ol copolymer, and the like.

In particular, ethylene-vinyl alcohol copolymer is advantageous when used industrially, because the copolymer can be easily obtained through saponification of ethylene-vinyl acetate copolymer.

Examples of the copolymer of ethylene and a (meth)acrylic ester-based monomer include ethylene-alkyl (meth)acrylate copolymers such as ethylene-methyl (meth)acrylate copolymer, ethylene-ethyl (meth)acrylate copolymer, ethylene-butyl (meth)acrylate copolymer, ethylene-isobutyl (meth)acrylate copolymer, ethylene-cyclohexyl (meth)acrylate copolymer, ethylene-2-ethylhexyl (meth)acrylate copolymer, tert-butylcyclohexyl (meth)acrylate copolymer; ethylene-glycidyl (meth)acrylate copolymer, ethylene-glycerine mono (meth)acrylate copolymer, ethylene-2-hydroxyethyl (meth)acrylate copolymer, ethylene-hydroxypropyl (meth)acrylate copolymer, ethylene-polyethylene glycol mono(meth)acrylate copolymer, ethylene-polypropylene glycol mono(meth)acrylate copolymer, ethylene-methoxypolyethylene glycol (meth)acrylate copolymer, and the like.

Moreover, ternary copolymers of ethylene and the forgoing monomers for copolymerization can also be used as the component (C) of the present invention. The copolymer of ethylene and a vinyl monomer having a hydroxyl group or an ester bond is preferably ethylene-vinyl acetate copolymer, ethylene-vinyl alcohol copolymer, ethylene-allyl alcohol copolymer, or an ethylene-alkyl (meth)acrylate copolymer. Among these, ethylene-vinyl alcohol copolymer and ethylene-alkyl (meth)acrylate copolymer are more preferable, and ethylene-vinyl alcohol copolymer and ethylene-methyl acrylate copolymer are further preferable. In particular, use of ethylene-vinyl alcohol copolymer is preferable because the ability to absorb oxygen can be improved.

Moreover, the degree of saponification of the ethylene-vinyl alcohol copolymer is preferably 90 mol % or more, and complete saponification is more preferable.

These may be used alone or in any combination of at least two of them.

The oxygen-absorbing resin composition of the present invention is obtainable by heating and melt-kneading the component (C) together with the component (A) and the component (B) by using an extruder or the like. Particularly, when ethylene-vinyl alcohol copolymer is used as the component (C), transesterification with the component (A) is likely to occur, and a graft polymer having segments originated from the component (A) is formed in side chains of the component (C). As a result, the obtained resin composition has a high melt tension and thus an improved extrusion lamination suitability. Hence, the use of ethylene-vinyl alcohol copolymer is preferable.

Another example of the blending method is a method in which the components (A), (B), and (C) are dissolved in a good solvent and mixed with each other, and then the solvent is removed.

The component (C) in the oxygen-absorbing resin composition of the present invention is used preferably in an amount of 1 to 50 wt %, and more preferably in an amount of 2 to 25 wt %, of the total weight of the components (A) and (B). When the amount of the component (C) is within the above-described ranges, a film having a high compatibility, an improved cohesive force of the oxygen-absorbing layer, and a preferable appearance with asperities on the surface being suppressed can be obtained.

When a resin having many carboxylic groups in the structure, such as maleic anhydride-graft-modified polyethylene, ethylene-maleic anhydride copolymer, or ethylene-(meth)acrylic acid copolymer, or a resin in which carboxylic groups are generated by the ring-opening reaction is used for the purpose of enhancing the compatibility, the oxygen absorption reaction may be inhibited, and the ability may greatly deteriorate. Accordingly, such resins are not preferable as the compatibilizer of the present invention.

The reactivity of the oxygen-absorbing resin composition according to the present invention is initiated by heating the resin composition during the synthesis of resin and/or the molding process and the like. It is also possible to increase the reactivity by aggressively providing the resin heat or to inhibit the reaction by preventing the resin composition from being heated. For example, if the reaction is inhibited, it is possible to increase the reactivity by exposing the resin composition to radiation.

The radiation exposed to the oxygen-absorbing resin composition used for the present invention includes particle beams such as electron beams, proton beams and neutron beams, and electromagnetic waves such as γ-rays, X-rays, visible light rays and ultraviolet light rays. Among them, light rays such as visible light rays and ultraviolet light rays which are low energy radiation are particularly preferable, and ultraviolet light rays are more preferable. Conditions for the irradiation of the resin composition with ultraviolet rays are preferably, for example, as follows: UV-A, and an integral quantity of light ranging from 100 to 10000 mJ/cm$^2$. The best time for the irradiation of the resin composition with ultraviolet rays is not specifically restricted. However, when using the resin composition as a material for an oxygen-absorbing container, the irradiation of the resin composition with ultraviolet rays is preferably carried out after the molding of the resin composition into a container and the charging of contents into the same, and immediately before the airtight sealing of the container, to make effective use of the oxygen-absorbing properties thereof.

The oxygen-absorbing resin composition of the present invention may further contain a thermoplastic resin other than the components (B) and (C). Any thermoplastic resin can be used as the thermoplastic resin other than the components (B) and (C). Examples of such thermoplastic resin include: acid-modified polyolefins, such as maleic anhydride-grafted polyethylene and maleic anhydride-grafted polypropylene; ethylene-vinyl compound copolymers, such as ethylene-vinyl acetate copolymer, ethylene-vinyl alcohol copolymer, ethylene-vinyl chloride copolymer, ethylene-(meth)acrylic acid copolymer, ionic crosslinked products thereof (ionomers), ethylene-methyl methacrylate copolymer; styrenic resins, such as polystyrene, acrylonitrile-styrene copolymer, and α-methylstyrene-styrene copolymer; polyvinyl compounds, such as poly(methyl acrylate) and poly(methyl methacrylate); polyamides, such as nylon 6, nylon 66, nylon 610, nylon 12, and poly(m-xylylene adipamide) (MXD6); polyesters, such as polyethylene terephthalate (PET), polybutylene terephthalate (PBT), poly(trimethylene terephthalate) (PTT), polyethylene naphthalate (PEN), glycol-modified polyethylene terephthalate (PETG), polyethylene succinate (PES), polybutylene succinate (PBS), poly(lactic acid), poly(glycolic acid), poly(caprolactone), and poly(hydroxy alkanoate); polycarbonates; polyethers, such as polyethylene oxide; and mixtures thereof.

The oxygen-absorbing resin composition of the present invention may further comprise a variety of additives such as a radical polymerization initiator and a photosensitizer.

The radical polymerization initiator and photosensitizer include those currently known as photopolymerization initiators such as benzoins and their alkyl ethers such as benzoin, benzoin methyl ether, benzoin ethyl ether and benzoin isopropyl ether; acetophenones such as acetophenone, 2,2-dimethoxy-2-phenylacetophenone, 2,2-diethoxy-2-phenylacetophenone, 1,1-dichloroacetophenone, 1-hydroxycyclohexyl phenyl ketone, 2-hydroxycyclohexyl phenyl ketone and 2-methyl-1-[4-(methylthio)phenyl]-2-morpholino-propan-1-one; anthraquinones such as 2-methylanthraquinone and 2-amylanthraquinone; thioxanthones such as 2,4-dimethylthioxanthone, 2,4-diethylthioxanthone, 2-chlorothioxanthone and 2,4-diisopropylthioxanthone; ketals such as acetophenone dimethyl ketal and benzyl dimethyl ketal; benzophenones such as benzophenone; and xanthones. Such photo- and radical-polymerization initiators may be used in combination with one or at least two conventionally known and currently used photopolymerization accelerator such as benzoic acid initiators or tertiary amine initiators.

Other additives include fillers, coloring agents, heat stabilizers, weatherable stabilizers, antioxidants, age resistors, light stabilizers, ultraviolet light absorbers, antistatic agents, lubricants such as metallic soaps and waxes, modifier resins or rubber and these additives may be incorporated into the resin or the resin composition according to any formulation known per se. For example, the blending a lubricant into the resin or the resin composition would improve the ability of a screw to bite the resin. The lubricants generally used herein are metallic soaps such as magnesium stearate and calcium stearate; those mainly comprising hydrocarbons such as liquid paraffin, naturally occurring and synthetic paraffin, microwaxes, polyethylene waxes and chlorinated polyethylene waxes; aliphatic acid lubricants such as stearic acid and lauric acid; aliphatic acid monoamide and bisamide lubricants such as stearic acid amide, palmitic acid amide, oleic acid amide, esylic acid amide, methylene bis-stearamide and ethylene bis-stearamide; ester lubricants such as butyl stearate, hardened castor oil and ethylene glycol monostearate; and mixtures thereof.

The oxygen-absorbing resin composition according to the present invention may be used for absorbing oxygen present in an air-tightly sealed package, in the form of, for example, powder, granules or a sheet. Moreover, they may be incorporated into a resin or rubber for a liner, a gasket or for forming a coating film in order to absorb the oxygen remaining in a package. In particular, the oxygen-absorbing resin and the oxygen-absorbing resin composition according to the present invention are preferably used as an oxygen-absorbing container made of a laminate which comprises at least one layer containing the resin or the resin composition and one or a plurality of layers of other resins.

The oxygen-absorbing container of the present invention comprises at least one layer (hereunder referred to as an "oxygen-absorbing layer") consisting of the foregoing oxygen-absorbing resin composition.

The materials for forming the layers other than the oxygen-absorbing layer, which constitute the oxygen-absorbing container of the present invention, may appropriately be selected from the group consisting of thermoplastic resins, thermosetting resins, and inorganic materials such as metals and paper while taking into consideration the modes of applications and required functions thereof.

Regarding the oxygen-absorbing container of the present invention, an oxygen-barrier layer is preferably arranged at least on the outer side of the oxygen-absorbing layer for the further improvement of the effect of the oxygen-absorbing resin or the oxygen-absorbing resin composition. Such a construction of the container would allow the effective absorption of the external oxygen possibly penetrating into the container and the oxygen remaining in the container to thus control the oxygen concentration in the container to a considerably low level over a long period of time.

The oxygen-barrier layer may be prepared using a resin having oxygen-barrier characteristic properties (oxygen-barrier resin). Such an oxygen-barrier resin may be, for instance, ethylene-vinyl alcohol copolymers (EVOH). Also usable herein as an oxygen-barrier resin may be, for example, a saponified copolymer obtained by the saponification of an ethylene-vinyl acetate copolymer having an ethylene content ranging from 20 to 60 mol % and preferably 25 to 50 mol % to a degree of saponification of not less than 96 mol % and preferably not less than 99 mol %. Other examples of such oxygen-barrier resins are poly(m-xylylene adipamide) (MXD6) and poly(glycolic acid). In addition, a nanocomposite material formed by incorporating an inorganic layered compound such as montmorillonite and the like into the above oxygen-barrier resin, the other polyamide resin and the like is preferably used.

In a case where the oxygen-absorbing container of the present invention is, in particular, a film container such as a pouch, usable as such an oxygen-barrier layer may be, for example, a foil of a light metal such as aluminum; a metal foil such as an iron foil, a tin plate foil, a surface-treated steel foil; a metal thin film or a metal oxide thin film formed on a substrate such as a biaxially oriented PET film by the evaporation method; or a diamond-like carbon thin film. It is also possible to use a barrier-coating film obtained by applying an oxygen-barrier coating layer onto a substrate film such as a biaxially oriented PET film.

A material constituting such metal thin films includes iron, aluminum, zinc, titanium, magnesium, tin, copper and silicon, with aluminum being particularly preferred.

A material constituting such metal oxide thin films includes silica, alumina, zirconium oxide, titanium oxide and magnesium oxide, with silica and alumina being particularly preferred. In this connection, one of these materials or any combination of at least two of them may be used and further a film of each material may be laminated with that of a material identical to or different from the former material.

The vapor deposition of such a thin film may be carried out according to any known method, for example, a physical vapor deposition technique (PVD technique) such as the vacuum deposition technique, the sputtering technique, the ion plating technique or the laser ablation technique; or a chemical vapor deposition technique (CVD technique) such as the plasma chemical vapor deposition technique, the thermal chemical vapor deposition technique or the optical chemical vapor deposition technique.

A material constituting the oxygen-barrier coating includes resins having a high ability to form hydrogen bonds such as polyvinyl alcohol, ethylene-vinyl alcohol copolymers, poly(meth)acrylic acids, poly(allyl-amine), polyacrylamide and polysaccharides, vinylidene chloride resins, and epoxy-amines. In addition, it is also preferred to incorporate an inorganic compound having a lamellar structure such as montmorillonite into these materials.

Moreover, containers having an oxygen-absorbing barrier layer which comprises the foregoing oxygen-barrier resin containing the oxygen-absorbing resin composition incorporated into the same are preferred as the oxygen-absorbing container of the present invention. In this case, a separate oxygen barrier layer and a separate oxygen-absorbing layer are not necessarily used, and therefore this would permit the simplification of the layer structure of the oxygen-absorbing container.

The oxygen-absorbing container may be produced by any molding method known per se.

For example, extrusion molding operations can be carried out using a number of extruders corresponding to the kinds of the resins used and a multilayered and multiple die to thus form a multi-layer film, a multi-layer sheet, a multi-layer parison or a multi-layer pipe. Alternatively, a multi-layer preform for molding bottles may be prepared according to a co-injection molding technique such as the simultaneous injection method or the sequential injection method using a number of extruders corresponding to the kinds of the resins used. Such a multi-layer film, parison or preform can be further processed to thus form an oxygen-absorbing multi-layered container.

A multi-layer film or a multi-layer sheet may be prepared using, for instance, the extrusion coating technique or the sandwich-lamination technique. In addition, single-layer and multi-layer films, which have been formed in advance, can be laminated together by the dry-lamination technique. Such methods specifically include, for example, a method in which a transparent vapor deposited film can be laminated with a co-extruded film having a three-layer structure—a thermoplastic resin layer/an oxygen-absorbing layer/a thermoplastic resin (sealant) layer—through the dry-lamination technique; a method in which two layers—an oxygen-absorbing layer/a sealant layer—can be extrusion-coated, through an anchoring agent, with a two-layer film comprising biaxially oriented PET film/aluminum foil laminated together by the dry-lamination technique; or a method in which a polyethylene single-layer film is sandwich-laminated, through a polyethylene-based oxygen-absorbing resin composition, with a two-layer film comprising barrier coating film/polyethylene film which are laminated by the dry-lamination technique, but the present invention is not restricted to these specific methods at all.

The packaging material such as a film may be used as pouches having a variety of shapes, and a capping material for trays and cups. Examples of such pouches include three sided seal or four sided seal flat pouches, gusseted pouches, standing pouches and pillow-shaped packaging bags. These bags may be prepared by any known bag-manufacturing method. Moreover, a film or a sheet can be subjected to a molding means such as the vacuum forming technique, the pressure forming technique, the stretch forming technique and the plug-assist forming technique to thus obtain a packaging container having a cup-like or tray-like shape.

Furthermore, a bottle or a tube may easily be formed by pinching off a parison, a pipe or a preform by using a pair of split molds and then blowing a fluid through the interior thereof. Moreover, a pipe or a preform is cooled, then heated to an orientation temperature and oriented in the axial direction while blow-orientating the same in the circumferential direction by the action of a fluid pressure to thus form a stretch blow-molded bottle.

The oxygen-absorbing container of the present invention can effectively inhibit any penetration of external oxygen into the container through the wall thereof and can absorb the oxygen remaining in the container. For this reason, the container is quite useful since it permits the maintenance of the internal oxygen concentration at a quite low level over a long period of time, the prevention of any quality deterioration of the content thereof due to the action of oxygen present therein and the prolonging of the shelf life of the content.

The oxygen-absorbing resin or composition of the present invention can thus be used for the packaging of contents quite susceptible to deterioration in the presence of oxygen, in particular, foods such as coffee beans, tea leaves (green tea), snacks, baked confectionery prepared from rice, Japanese unbaked and semi-baked cakes, fruits, nuts, vegetables, fish and meat products, pasted products, dried fish and meat, smoked fish and meat, foods boiled in soy sauce, uncooked and cooked rice products, infant foods, jam, mayonnaise, ketchup, edible fats and oils, dressings, sauces and dairy products; beverages such as beer, wine, fruit juices, green tea, and coffee; and other products such as pharmaceutical preparations, cosmetic products and electronic parts, but the present invention is not restricted to these specific ones at all.

EXAMPLES

The present invention will hereunder be described in more detail with reference to the following Examples. In the following Examples, each numerical value was determined according to the method specified below:

(1) Number Average Molecular Weight ($M_n$) and Molecular Weight Distribution ($M_w/M_n$)

This was determined by the gel permeation chromatography (GPC) technique (HLC-8120 Model GPC available from Tosoh Corporation) and expressed in terms of the value relative to that of the polystyrene. In this case, chloroform was used as the solvent.

(2) Relative Proportions in Polyester Resin

Relative proportions of the acid components contained in the resin were calculated on the basis of 1H-NMR (using EX270 available from JEOL DATUM LTD.). Specifically, the relative proportions of the acid components contained in the resin were calculated from the area ratio of signals of: proton of benzene ring from terephthalic acid (8.1 ppm); methylene proton adjacent to ester groups derived from methyltetrahydrophthalic anhydride (4.1 to 4.2 ppm); and methylene proton adjacent to ester groups derived from telephthalic acid (4.3 to 4.4 ppm). The solvent used herein was deuterochloroform containing tetramethylsilane as a reference material.

The relative proportions in the polyester resin A to be described later were substantially identical to the fed amounts (mole ratio) of monomers used in the polymerization.

(3) Melt Viscosity (MI)

A MI (g/10 min) was measured in accordance with the testing method specified in JIS K7210 under conditions where the testing temperature was 190° C., and the load was 2.16 kg.

(4) Melt Tension (MT)

A MT (mN) was measured as follows. Specifically, CAPILLOGRAPH 1B available from Toyo Seiki Seisaku-sho, LTD. equipped with a capillary having a diameter of 1 mm and a length of 8.0 mm was used. The resin was filled in a barrel having an inner diameter of 9.55 mm, and the resin melt by heating at 200° C. was extruded to the atmosphere at a rate of 50 mm/min to form a strand. Here, the MT (mN) was measured at pulling rate of 20 m/min.

Evaluation

(1) Ability to Absorb Oxygen (Amount of Oxygen Absorbed)

A laminated film cut out was introduced into an oxygen-impermeable steel foil-laminated cup having an inner volume of 85 cm$^3$, and then the cup was sealed by heating with an aluminum foil-laminated film cap and stored in an atmosphere at 22° C. After storage for a predetermined time period, the oxygen concentration in the cup was determined by a micro-gas chromatograph (M–200 available from Agilent Technology Co., Ltd.) to thus calculate the amount of oxygen absorbed per 1 cm$^2$ of the laminated film.

(2) Extrusion Lamination Suitability

The state of the oxygen-absorbing layer at the preparation of the laminated film was evaluated as follows. If neck-in and drawdown hardly occurred, the evaluation was ○. If neck-in and drawdown were significant, and the thickness of the film was very uneven, the evaluation was x. If the state was between the two, the evaluation was Δ.

(3) Appearance of Film

This was visually evaluated as follows. If the LDPE domain of the oxygen-absorbing layer was finely dispersed, providing an excellent appearance to the laminated film, the evaluation was ○. If the LDPE domain of the oxygen-absorbing layer was poorly dispersed, so that asperities were observed on the surface of the laminated film, the evaluation was x.

[Preparation of Oxygen-Absorbing Polyester A]

To a separable flask equipped with a stirring machine, a nitrogen gas-introduction tube, and a Dean-Stark type water separator were added 100 parts by weight of methyltetrahydrophthalic anhydride (HN-2200 available from Hitachi Chemical Co.,) containing 45% by weight of 4-methyl-Δ3-tetrahydrophthalic anhydride, 100 parts by weight of terephthalic acid (available from Wako Pure Chemical Industries, Ltd.), and 220 parts by weight of 1,4-butanediol (available from Wako Pure Chemical Industries, Ltd.), and allowed to react in a nitrogen atmosphere at a temperature ranging from 150° C. to 200° C. for approximately 6 hours by using isopropyl titanate (300 ppm, available from Kishida Chemical Co., Ltd.) as a polymerization catalyst, while removing the water generated. Subsequently, polymerization was performed at a reduced pressure of 0.1 kPa at 220° C. for approximately 2 hours. Thus a rubber-like oxygen-absorbing polyester A was obtained. Here, $M_n$ was approximately 7100, and $M_w/M_n$ was 11.3.

The obtained resin was allowed to stand in a nitrogen atmosphere at 50° C. for 8 hours for crystallization, pelletized while the resin was cooled, and then dried in a vacuum dryer.

Example 1

50 parts by weight of the oxygen-absorbing polyester A, 47.5 parts by weight of an LDPE resin (L719 available from Ube-Maruzen Polyethylene Co., Ltd.,), and 2.5 parts by weight of an ethylene-vinyl alcohol copolymer (EVOH) (Melthene H-6051K available from Tosoh Corporation, a completely saponified product), as the compatibilizer, having a proportion of ethylene of 89 mol % were dry blended, fed to a twin screw extruder (ULT Nano 05-20AG available from Technovel Corporation) equipped with a strand die at an outlet portion thereof, and kneaded at a molding temperature of 180° C. and at a screw revolution of 300 rpm while evacuation was performed through a high vacuum vent. Thus, the oxygen-absorbing resin composition shown in Table 1 was prepared.

Next, the oxygen-absorbing resin composition and the LDPE resin were co-extruded and laminated on an vapor-deposited surface of an aluminum oxide-vapor-deposited biaxially oriented polyethylene terephthalate (PET) film (GL-ARH-F available from Toppan Printing Co., Ltd) under an extrusion temperature condition of 200° C. Thus each laminated film formed of a transparent vapor-deposited PET layer (12 μm)/an oxygen-absorbing layer (60 μm)/a LDPE layer (20 μm) was prepared.

Evaluation was conducted on suitability for extrusion lamination of the oxygen-absorbing layer of the laminated film, appearance of the obtained laminated film, and the ability to absorb oxygen by using a 20-cm$^2$ piece cut out from the laminated film. Table 2 shows the results.

Example 2

The oxygen-absorbing resin composition shown in Table 1 was prepared in a similar manner to that in Example 1, except that 50 parts by weight of the oxygen-absorbing polyester A, 45 parts by weight of the LDPE, and 5 parts by weight of the EVOH, as the compatibilizer, having a proportion of ethylene of 89 mol % were used.

Subsequently, laminated films were prepared in a similar manner to that in Example 1 and then evaluated. Table 2 shows the results.

Example 3

The oxygen-absorbing resin composition shown in Table 1 was prepared in a similar manner to that in Example 1, except that 50 parts by weight of the oxygen-absorbing polyester A, 40 parts by weight of the LDPE, and 10 parts by weight of the EVOH, as the compatibilizer, having a proportion of ethylene of 89 mol % were used.

Subsequently, laminated films were prepared in a similar manner to that in Example 1 and then evaluated. Table 2 shows the results.

Example 4

The oxygen-absorbing resin composition shown in Table 1 was prepared in a similar manner to that in Example 1, except that 50 parts by weight of the oxygen-absorbing polyester A, 30 parts by weight of the LDPE, and 20 parts by weight of the EVOH, as the compatibilizer, having a proportion of ethylene of 89 mol % were used.

Subsequently, laminated films were prepared in a similar manner to that in Example 1 and then evaluated. Table 2 shows the results.

Example 5

The oxygen-absorbing resin composition shown in Table 1 was prepared in a similar manner to that in Example 1, except that 40 parts by weight of the oxygen-absorbing polyester A, 55 parts by weight of the LDPE, and 5 parts by weight of the EVOH, as the compatibilizer, having a proportion of ethylene of 89 mol % were used.

Subsequently, laminated films were prepared in a similar manner to that in Example 1 and then evaluated. Table 2 shows the results.

Example 6

The oxygen-absorbing resin composition shown in Table 1 was prepared in a similar manner to that in Example 1, except that 60 parts by weight of the oxygen-absorbing polyester A, 35 parts by weight of the LDPE, and 5 parts by weight of the EVOH, as the compatibilizer, having a proportion of ethylene of 89 mol % were used.

Subsequently, laminated films were prepared in a similar manner to that in Example 1, except that a transparent vapor-deposited PET film (Max Barrier R available from Tohcello Co., Ltd.) was used as the oxygen-barrier layer. Then the laminated films were evaluated. Table 2 shows the results.

Example 7

The oxygen-absorbing resin composition shown in Table 1 was prepared in a similar manner to that in Example 1, except that 50 parts by weight of the oxygen-absorbing polyester A, 45 parts by weight of the LDPE, and 5 parts by weight of an EVOH, as the compatibilizer, (obtained after the extraction of additives contained in Melthene H6960 available from Tosoh Corporation with chloroform and having a degree of saponification of 90 mol %) having a proportion of ethylene of 81 mol % were used.

Subsequently, laminated films were prepared in a similar manner to that in Example 1 and then evaluated. Table 2 shows the results.

Example 8

The oxygen-absorbing resin composition shown in Table 1 was prepared in a similar manner to that in Example 1, except that 50 parts by weight of the oxygen-absorbing polyester A, 45 parts by weight of the LDPE, and 5 parts by weight of an ethylene-methyl acrylate copolymer (EMA) (EB330H available from Japan Polyethylene Corporation), as the compatibilizer, having a proportion of ethylene of 96 mol % were used.

Subsequently, laminated films were prepared in a similar manner to that in Example 1 and then evaluated. Table 2 shows the results.

Comparative Example 1

The oxygen-absorbing resin composition shown in Table 1 was prepared in a similar manner to that in Example 1, except that 50 parts by weight of the oxygen-absorbing polyester A and 50 parts by weight of the LDPE were used.

Subsequently, laminated films were prepared in a similar manner to that in Example 1 and then evaluated. Table 2 shows the results.

Comparative Example 2

The oxygen-absorbing resin composition shown in Table 1 was prepared in a similar manner to that in Example 1, except that 50 parts by weight of the oxygen-absorbing polyester A, 45 parts by weight of the LDPE, and 5 parts by weight of a maleic anhydride-graft-modified polyethylene wax (2203A available from Mitsui Chemicals, Inc., and having an amount of maleic anhydride grafted of 3 wt %), as the compatibilizer, were used.

Subsequently, laminated films were prepared in a similar manner to that in Example 1 and then evaluated. Table 2 shows the results.

Comparative Example 3

The oxygen-absorbing resin composition shown in Table 1 was prepared in a similar manner to that in Example 1, except that 50 parts by weight of the oxygen-absorbing polyester A, 45 parts by weight of the LDPE, and 5 parts by weight of an ethylene-methacrylic acid copolymer (EMAA) (N0908C available from Dupont-Mitsui Polychemicals Co., Ltd), as the compatibilizer, having a proportion of ethylene of 97 mol % were used.

Subsequently, laminated films were prepared in a similar manner to that in Example 1 and then evaluated. Table 2 shows the results.

Comparative Example 4

The oxygen-absorbing resin composition shown in Table 1 was prepared in a similar manner to that in Example 1, except that 50 parts by weight of the oxygen-absorbing polyester A, 45 parts by weight of the LDPE, and 5 parts by weight of an EVOH (Soarnol H4815 available from The Nippon Synthetic Chemical Industry Co., Ltd.) having a proportion of ethylene of 48 mol % were used.

Subsequently, laminated films were prepared in a similar manner to that in Example 1 and then evaluated. Table 2 shows the results.

TABLE 1

| | | | Oxygen-absorbing resin composition | | | | |
| | | | | Component (C) | | | Melt |
| Example | Component (A) Oxygen-absorbing polyester | Component (B) Polyolefin | Type | Ethylene proportion (mol %) | Blend proportion (wt %) (A)/(B)/(C) | Melt Viscosity (MI) (g/10 min) | Melt Tension (MT) (mN) |
| --- | --- | --- | --- | --- | --- | --- | --- |
| 1 | A | LDPE | EVOH | 89 | 50/47.5/2.5 | 14.3 | 8.6 |
| 2 | A | LDPE | EVOH | 89 | 50/45/5 | 16.4 | 8.3 |
| 3 | A | LDPE | EVOH | 89 | 50/40/10 | 15.2 | 8.4 |

TABLE 1-continued

Oxygen-absorbing resin composition

| | | | Component (C) | | | Melt | |
|---|---|---|---|---|---|---|---|
| Example | Component (A) Oxygen-absorbing polyester | Component (B) Polyolefin | Type | Ethylene proportion (mol %) | Blend proportion (wt %) (A)/(B)/(C) | Melt Viscosity (MI) (g/10 min) | Tension (MT) (mN) |
| 4 | A | LDPE | EVOH | 89 | 50/30/20/ | 14.1 | 8.1 |
| 5 | A | LDPE | EVOH | 89 | 40/55/5/ | 12.7 | 12.5 |
| 6 | A | LDPE | EVOH | 89 | 60/35/5 | 19.3 | 7.7 |
| 7 | A | LDPE | EVOH | 81 | 50/45/5 | 17 | 7.7 |
| 8 | A | LDPE | EMA | 96 | 50/45/5 | 17.5 | 6.6 |
| *1 | A | LDPE | none | | 50/50/0 | 19.5 | 6.9 |
| *2 | A | LDPE | Acid-modified PE wax | — | 50/45/5 | 25.9 | 9.1 |
| *3 | A | LDPE | EMAA | 97 | 50/45/5 | 17.3 | 6.7 |
| *4 | A | LDPE | EVOH | 48 | 50/45/5 | 17.5 | 6.6 |

*Comparative Example
LDPE: Low density polyethylene
EVOH: Saponified ethylene-vinyl acetate copolymer
EMA: Ethylene-methyl acrylate copolymer
Acid-modified PE: Maleic anhydride-grafted modified polyethylene
EMAA: Ethylene-methacrylic acid copolymer

TABLE 2

| Example | Ability to absorb oxygen (cc/cm$^2$) | | Judgment | Extrusion lamination suitability | Appearance of film | Overall judgment |
|---|---|---|---|---|---|---|
| | After 3 days | After 7 days | | | | |
| 1 | 0.029 | 0.060 | ⊚ | ○ | ○ | ⊚ |
| 2 | 0.030 | 0.063 | ⊚ | ○ | ○ | ⊚ |
| 3 | 0.030 | 0.064 | ⊚ | ○ | ○ | ⊚ |
| 4 | 0.030 | 0.063 | ⊚ | ○ | ○ | ⊚ |
| 5 | 0.020 | 0.045 | ○ | ○ | ○ | ○ |
| 6 | 0.036 | 0.082 | ⊚ | ○ | ○ | ⊚ |
| 7 | 0.022 | 0.043 | ○ | ○ | ○ | ○ |
| 8 | 0.018 | 0.043 | ○ | Δ | ○ | ○ |
| *1 | 0.019 | 0.045 | ○ | Δ | X | X |
| *2 | 0 | 0 | X | X | ○ | X |
| *3 | 0.005 | 0.017 | X | Δ | ○ | X |
| *4 | 0.008 | 0.024 | X | Δ | X | X |

*Comparative Example

TABLE 3

| | Oxygen concentration within the container (%) | | | | | |
|---|---|---|---|---|---|---|
| Example | After 0 day | After 1 day | After 2 days | After 4 days | After 7 days | After 10 days |
| 9 | 20.9 | 17.3 | 9.7 | 2.5 | 0 | 0 |
| 10 | 20.9 | 16.2 | 7.1 | 1.2 | 0 | 0 |
| 11 | 20.9 | 18.8 | 11.1 | 3.5 | 0.1 | 0 |

Example 9

A flat pouch having an effective area of 48 cm$^2$ and an inner volume of 5 ml was prepared by stacking the laminated films prepared in Example 2 with the LDPE layers facing to each other, and heat-sealing four sides of the laminated films.

This flat pouch was stored at 22° C., and the oxygen concentration in the container was monitored by using a micro-gas chromatograph (M200 available from Agilent Technologies, Inc.). Table 3 shows the results.

Example 10

A flat pouch was prepared, and the oxygen concentration in the container was monitored, in a similar manner to that in Example 9, except that the laminated films prepared in Example 6 were used. Table 3 shows the results.

Example 11

A flat pouch was prepared, and the oxygen concentration in the container was monitored, in a similar manner to that in Example 9, except that the laminated films prepared in Example 8 were used. Table 3 shows the results.

The invention claimed is:

1. An oxygen-absorbing resin composition obtained by melt-kneading the following component (A) and the following component (B) together with the following component (C) serving as a compatibilizer:
    component (A): an oxygen-absorbing polyester,
    component (B): a polyolefin selected from the group consisting of a polyethylene, a polypropylene, poly-1-butene, poly-4-methyl-1-pentene, random or block copolymers of α-olefins, cyclic olefin polymers (COP), and cyclic olefin copolymers (COCP), and
    component (C): an ethylene-vinyl alcohol copolymer, the copolymer having a proportion of ethylene of 70 mol % to 99 mol %.

2. The oxygen-absorbing resin composition according to claim 1, wherein a degree of saponification of the ethylene-vinyl alcohol copolymer is 90 mol % or more.

3. The oxygen-absorbing resin composition according to claim 1, wherein the ethylene-vinyl alcohol copolymer is an ethylene-alkyl (meth)acrylate copolymer.

4. The oxygen-absorbing resin composition according to claim 1, wherein the oxygen-absorbing polyester is obtained by polymerizing a raw material containing a monomer selected from the group consisting of the following monomer (i) and the following monomer (ii):
    (i) a monomer having a carbon atom bonded to both of groups having the following structures (a) and (b), respectively, and further bonded to one or two hydrogen atoms, the carbon atom being contained in an alicyclic structure:
        (a) a carbon-carbon double bond group, and
        (b) a group selected from the group consisting of heteroatom-containing functional groups, bonding groups derived therefrom, carbon-carbon double bond groups, and aromatic rings; and (ii) a monomer in which a carbon atom adjacent to a carbon-carbon double bond in an unsaturated alicyclic structure is bonded to an electron donating group and a hydrogen atom, another carbon atom adjacent to the carbon atom is bonded to a heteroatom-containing functional group or a bonding group derived therefrom, and the electron donating group and the heteroatom-containing functional group or the bonding group derived therefrom are in a cis position.

5. The oxygen-absorbing resin composition according to claim 1, wherein the oxygen-absorbing polyester is obtained by polymerizing a raw material containing a monomer having a structure of tetrahydrophthalic acid or tetrahydrophthalic anhydride.

6. The oxygen-absorbing resin composition according to claim 1, wherein the oxygen-absorbing polyester is obtained by polymerizing a raw material containing: a monomer having the structure of tetrahydrophthalic acid or tetrahydrophthalic anhydride; 1,4-butanediol; and telephthalic acid.

7. The oxygen-absorbing resin composition according to claim 5, wherein the monomer having the structure of tetrahydrophthalic acid or tetrahydrophthalic anhydride is selected from the group consisting of 4-methyl-Δ3-tetrahydrophthalic acid, derivatives thereof, 4-methyl-Δ3-tetrahydrophthalic anhydride, derivatives thereof, cis-3-methyl-Δ4-tetrahydrophthalic acid, derivatives thereof, cis-3-methyl-Δ4-tetrahydrophthalic anhydride, and derivatives thereof.

8. The oxygen-absorbing resin composition according to claim 1, wherein the polyolefin is polyethylene.

9. The oxygen-absorbing resin composition according to claim 8, wherein the polyethylene is low-density polyethylene.

10. The oxygen-absorbing resin composition according to claim 1, wherein a weight ratio of the component (A) to the component (B) is 4:1 to 3:7.

11. The oxygen-absorbing resin composition according to claim 1, wherein the component (C) is used at 1 wt % to 50 wt % relative to the total weight of the component (A) and the component (B).

12. An oxygen-absorbing container comprising an oxygen-absorbing layer including the oxygen-absorbing resin composition according to claim 1.

13. The oxygen-absorbing container according to claim 12, further comprising an oxygen barrier layer provided outside the oxygen-absorbing layer.

14. The oxygen-absorbing resin composition according to claim 1, wherein the oxygen-absorbing polyester is present in an amount of 40 wt. % to 60 wt. %, based on the total weight of the composition.

15. The oxygen-absorbing resin composition according to claim 1, wherein the polyolefin is present in an amount of 30 wt. % to 55 wt. %, based on the total weight of the composition.

16. The oxygen-absorbing resin composition according to claim 1, wherein the ethylene-vinyl alcohol copolymer is present in an amount of 2.5 wt. % to 20 wt. %, based on the total weight of the composition.

* * * * *